United States Patent
Legatti et al.

(12) 
(10) Patent No.: US 6,292,337 B1
(45) Date of Patent: Sep. 18, 2001

(54) ELECTRICAL SYSTEM WITH ARC PROTECTION

(75) Inventors: Raymond H. Legatti; Robert S. Wiggins, both of Clearwater, FL (US)

(73) Assignee: Technology Research Corporation, Clearwater, FL (US)

( * ) Notice: Subject to any disclaimer, the term of this patent is extended or adjusted under 35 U.S.C. 154(b) by 0 days.

(21) Appl. No.: 08/682,957

(22) Filed: Jul. 18, 1996

Related U.S. Application Data

(63) Continuation-in-part of application No. 08/526,032, filed on Sep. 8, 1995, now abandoned, which is a continuation-in-part of application No. 08/102,203, filed on Aug. 5, 1993, now abandoned.

(51) Int. Cl.$^7$ ................................ H02H 3/16; H02H 3/00
(52) U.S. Cl. ............................................. 361/46; 361/93.1
(58) Field of Search .................... 361/42–50, 93, 361/2, 93.5, 93.1, 93.6, 93.9

(56) References Cited

U.S. PATENT DOCUMENTS

| | | |
|---|---|---|
| 2,864,036 | 12/1958 | Steiner . |
| 3,493,815 * | 2/1970 | Hurtle ................................... 361/55 |
| 4,587,588 * | 5/1986 | Goldstein .............................. 361/54 |
| 4,598,331 * | 7/1986 | Legatti ................................... 361/46 |
| 4,751,603 * | 6/1988 | Kwan .................................... 361/42 |
| 4,823,225 * | 4/1989 | Foster et al. ........................... 361/42 |
| 5,488,303 | 1/1996 | Bagalini ................................ 324/509 |

FOREIGN PATENT DOCUMENTS 2277417    10/1994   (GB) .

* cited by examiner

Primary Examiner—Michael J. Sherry
Assistant Examiner—Kim Huynh
(74) Attorney, Agent, or Firm—Jon Carl Gealow

(57) ABSTRACT

An electrical system, such as a system for providing power to an appliance or a building, includes arcing current protection, either in connection with or separate from a ground fault circuit interrupter (GFCI). In one embodiment a sensing lead is located between a power line and a neutral line conveying power to the load, but is not connected to the load. The sensing lead is preferably larger than the power line and neutral line. Also, an integrity checking device may be connected from the sensing lead to the power line to determine continuity of the sensing lead, but current flow through the integrity checking device is limited to a very small magnitude. When an arcing current above a predetermined magnitude occurs in the sensing lead, an SCR is triggered to open the circuit. The sensing lead in such an embodiment may be the ground line of a three line system. In another embodiment, a supplemental winding is placed upon the core of the differential transformer of a GFCI, so that arcing current in the sensing lead above a predetermined magnitude will pass through the supplemental winding and cause the circuit to be opened. In both embodiments, a test circuit may be included to check operation of the circuit portions responsive to the current in the sensing lead.

25 Claims, 3 Drawing Sheets

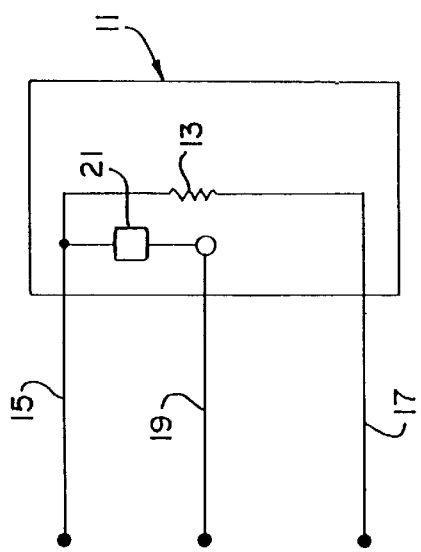
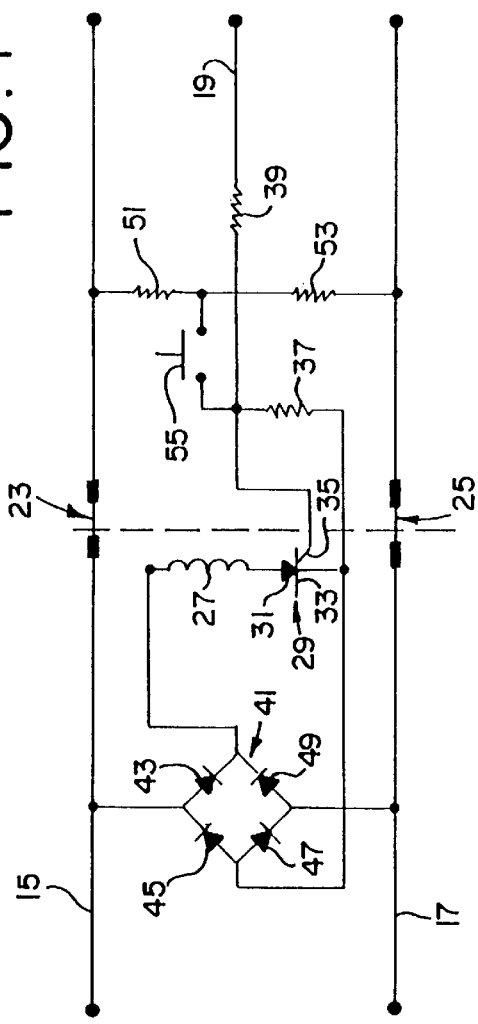
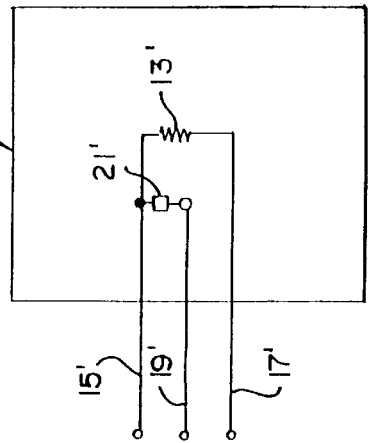
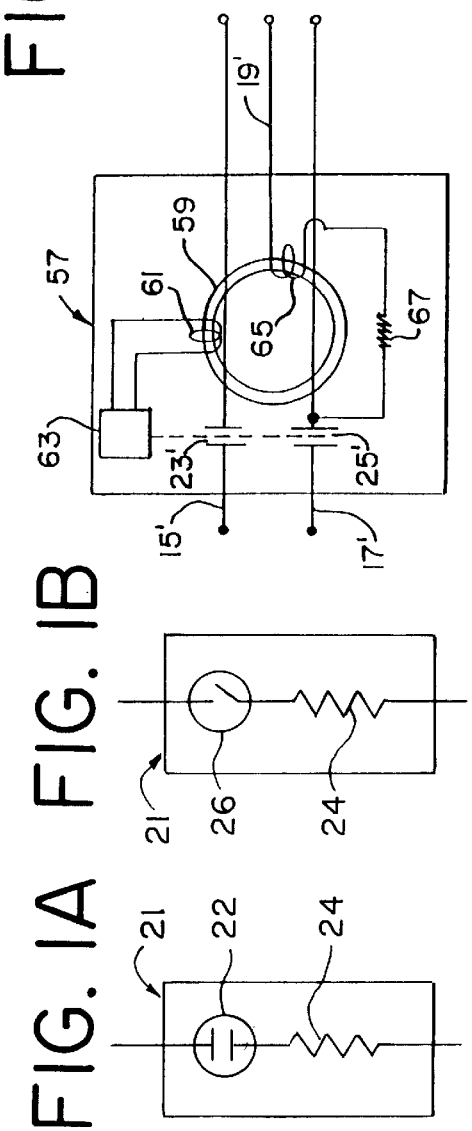

ELECTRICAL SYSTEM WITH ARC PROTECTION

CROSS-REFERENCE TO RELATED APPLICATION

This application is a continuation-in-part of U.S. patent application Ser. No. 08/526,032, filed on Sep. 8, 1995, now abandoned, which was a continuation-in-part of U.S. patent application Ser. No. 08/102,203, filed on Aug. 5, 1993 and now abandoned.

BACKGROUND OF THE INVENTION

1. Field of the Invention

This invention relates generally to an electrical system in which a power circuit is opened in the event that arcing current in excess of a predetermined magnitude is detected, and more specifically, this invention relates to an electrical system in which power is removed from an appliance or an entire house when arcing current in excess of a predetermined magnitude occurs, such as that resulting from the failure of insulation about a power line in the appliance cord or between lines of a house supply circuit.

2. Description of the Prior Art

In many instances in which people interact with electrically powered equipment (referred to generally herein as appliances), there is a possibility of the operator of the appliance being exposed to potentially dangerous electrical shocks, as well as the production of electrical fires. Similarly, an entire house and the members of the household can be exposed to such risks if there are failures in the electrical supply circuitry of the house. Although circuit breakers and fuses have been used for many years to protect electrical appliances, operating personnel, houses, members of the household and the surrounding environment from very large electrical currents and voltages, it is only within the relatively recent past that greater attention has been directed to the protection of individuals and property from less catastrophic, but still potentially dangerous, electrical shocks and fire hazards.

One type of protective device that is coming into much more general usage is the ground fault circuit interrupter (GFCI). A GFCI is used to protect against an undesired grounding of a power line, such as by a person inadvertently being connected from the power line to ground at an outlet in the home. A common form of such a ground fault circuit interrupter includes a differential transformer with opposed primary windings, one primary winding being associated with a power line and the other being associated with a neutral return line. If a ground fault should occur on the load side of the GFCI, the magnetic flux of the two primary windings will not cancel, with the result that a flux flow is produced in the core of the differential transformer. This resulting flux flow is detected by a secondary winding on the differential transformer core, and the secondary winding then produces a trip signal for a circuit opening arrangement to open the power line.

Besides GFCIs, other personal protection devices include appliance leakage current interrupters (ALCIs), equipment leakage current interrupters (ELCIs) and immersion detection circuit interrupters (IDCIs). Underwriters Laboratories, Inc., in its Reference Standard UL943A, has jointly characterized GFCIs, ALCIs ELCIs and IDCIs as Leakage Current Protection Devices. Whenever the term GFCI is used herein, it is intended in the broader sense of a Leakage Current Protection Device, where applicable.

While such GFCI applications have protected many people from serious injury or death in the event of a ground fault or leakage current, there are other types of hazardous situations that may not be protected against by the basic GFCI circuit. Thus, for example, in U.S. Pat. No. 4,598,331, arrangements are shown for protecting against potentially hazardous situations such as an open neutral or ground lead, an excessive voltage between the neutral lead and the ground lead, and reversal of input connections between the power and neutral lines. However, there are concerns with respect to electrical power cords and equipment other than these situations that are potentially hazardous to a person using the equipment.

One such concern relates to the arcing between a power line and a neutral line, which could also include leakage currents above a certain magnitude. Such electrical arcing may not be a direct threat to an individual person, but it can result in combustion. The resulting fire is potentially hazardous to both health and property. A GFCI with protection against this type of arcing threat in an electrical power cord or cable having a metallic sheath or cover is disclosed in U.S. Pat. No. 4,931,894.

However, arcing is not a threat solely in the situation where a metal sheath is utilized in a cord or cable, but is an equal, if not greater problem, where the power line and the neutral line are not shielded by a metallic sheath. In U.S. Pat. No. 4,931,894 (col. 3, lines 1–10), reference is made generally to the use of a sensing lead, either separate from or in addition to the metallic sheath. In a three lead system the ground lead may be utilized as the sensing lead. In addition, arcing or leakage current protection of this type is desirable as a separate feature, as well as in conjunction with a GFCI.

One area of particular concern are the appliance cords utilized to convey power to an appliance. These cords may be exposed to frequent bending or the placement of heavy objects on them that can, particularly over time, break down the insulation surrounding the power line and the neutral line. As the insulation breaks down, leakage currents and arcing can occur between the power line and the neutral line. The Consumer Product Safety Commission contends that hundreds of fires are started each year by such faulty appliance cords.

Even if the appliance cord incorporates a GFCI, or is plugged into a GFCI, arcing on the load side will not unbalance the differential transformer and thus will not be detected by the GFCI. As these potential arcing conditions could be hazardous to health and safety, it is desirable to protect against them, as well as the ground fault or leakage currents that would be detected by a GFCI.

Since it is desirable to detect arcing currents below the combustion level, it means that it is necessary to detect relatively small currents. The development of an arc occurs in three phases: (1) leakage current; (2) tracking; and (3) actual arcing. It is preferable to open the circuit before arcing actually occurs, most preferably in the first phase of a leakage current, which is the goal of this invention.

Trying to detect small leakage currents at a distance could involve undesired nuisance tripping. Thus, it is desirable to have the protective arrangement in the appliance cord, rather than being associated with the electrical supply end of the circuitry.

In the case of a house electrical supply circuit, it would be desirable to have interruption of the circuit achieved at the point where electrical power is introduced into the building to minimize the chances of fire.

SUMMARY OF THE INVENTION

The present invention relates to an electrical system that includes protection against such leakage currents and arcing (generally referred to as arcing currents herein), either separate from or in connection with a GFCI. Preferably, such arcing protection should be included in an appliance cord itself, rather than being located at a distance from the appliance.

In one embodiment, an unshielded sensing lead is included in the appliance cord and is insulated from an unshielded power line and an unshielded neutral line. Preferably, the sensing lead is larger than the power line and the neutral line so that no current paths between the power and neutral lines can be found to bypass the sensing lead. This sensing lead is substantially electrically isolated from the electrical load of the appliance, although a sensing lead integrity checking device, such as a neon glow tube or a switch, can be connected between the sensing lead and the power line. The integrity checking device connects the power line to the neutral line through the sensing lead, but any impedance of the integrity checking device is increased by substantial additional resistance, so that the current flow is very small, well below the predetermined magnitude that would initiate response of the arcing current protection arrangement. Thus, although the integrity checking device does provide a connection between the sensing lead and the power line, either the power line and the sensing lead are not connected except for a brief period for integrity checking through a switch, or the total impedance between the power line and the sensing lead is so high that, for practical purposes of the arcing current protection arrangement, the sensing lead is isolated from the power line and the appliance load.

A rectifier, such as a full wave diode rectifier, may be connected between the power line and the neutral line to provide DC power to a circuit opening device, such as a solenoid coil with normally closed contacts in the power line. In most situations, it would also be desirable to have the neutral line opened, so a second pair of normally closed contacts in the neutral line would be actuated by the solenoid.

Energization of the solenoid coil may be controlled by a suitable switching device, such as a silicon controlled rectifier (SCR) having the anode-cathode circuit connected in series with the solenoid coil. The gate of the SCR coil may be connected to the cathode through a suitable resistance that will bias the SCR to a conducting state when current flow of a pre-determined magnitude passes through the resistance, thus providing a current responsive arrangement. The sensing lead would also be connected to the gate of the silicon controlled rectifier, usually through a limiting resistor. Of course, with a different type of circuit opening device the sensing lead would be connected to the control circuitry therefor.

When the sensing lead has an arcing current produced therein above the predetermined magnitude, such as by detecting an arc resulting from a breakdown of the insulation separating the power line and the neutral line, the SCR will be gated to a conducting state and the solenoid will be energized to open the power line and, usually, the neutral line as well.

This embodiment of the arcing current protection arrangement may be used independently of a GFCI, although a GFCI would normally be included somewhere within the electrical system to protect against ground fault currents. In addition, a second embodiment may be provided expressly for use with a GFCI.

In the second embodiment, a supplemental coil would be placed upon the core of the differential transformer of a GFCI. The sensing lead would be connected to this supplemental winding, which is in turn connected to the neutral line through a suitable resistance. If an arcing current above the pre-determined magnitude should occur in the sensing lead, the current flow through the supplemental winding would create an imbalance in the differential transformer, which in turn would produce a trip signal in the secondary winding of the differential transformer. The trip signal in the secondary winding would initiate actuation of a circuit opening device to break the power line and protect against the hazardous conditions that might be created by the arcing current.

The number of turns of the supplemental winding may be varied to adjust the sensitivity of the arrangement to arcing current. Thus, the magnitude of the arcing current which the circuit opening device will be actuated may be adjusted in accordance with the desired protection plan. The resistance in series with the supplemental winding would also be adjusted in connection therewith to establish the predetermined magnitude of arcing current at which tripping is desired.

A third embodiment relates to use of the invention to protect an entire house or other building, or a separate electrically powered unit or area of any sort. With a three line system, the ground line may be utilized as the sensing lead. In the case of a house, the protective circuitry would be located in the junction box where electrical power is brought into the house from the electrical supply cables.

These and other objects, advantages and features of this invention will hereinafter appear, and for purposes of illustration, but not of limitation, exemplary embodiments of the subject invention are shown in the appended drawing.

BRIEF DESCRIPTION OF THE DRAWING

FIG. 1 is a schematic circuit diagram of a first preferred embodiment of the electrical system of the present invention.

FIG. 1A is a schematic diagram of a first embodiment of the integrity checking device shown in FIG. 1.

FIG. 1B is a schematic diagram of a second embodiment of the integrity checking device shown in FIG. 1.

FIG. 2 is a schematic circuit diagram of a second preferred embodiment of the electrical system of the present invention.

DETAILED DESCRIPTION OF THE PREFERRED EMBODIMENTS

An appliance 11 is schematically illustrated in FIG. 1. Appliance 11 has an electrical load 13. Although referred to as an appliance load, it should be recognized that the load 13 could be any suitable type of electrical device utilizing a cord as disclosed herein.

Figure 3:
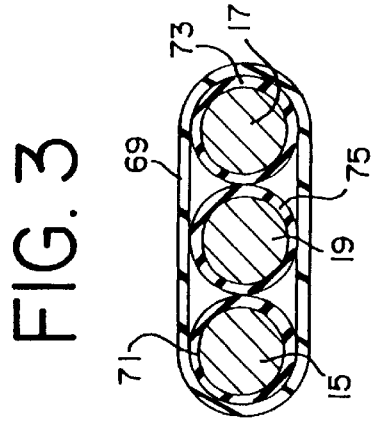
FIG. 3 is a schematic cross-sectional view of a flat appliance cord illustrating a sensing lead between the power line and the neutral line.

Electrical power for the load 13 of appliance 11 is obtained from an unshielded power line 15 and an unshielded neutral line 17. The power and neutral lines would normally be encompassed in some type of appliance cord, an example of which is illustrated in FIG. 3 hereof.

Included with the power and neutral lines is an unshielded sensing lead 19. Sensing lead 19 is located between the power line 15 and the neutral line 17, although it is substantially electrically isolated from the electrical load 13 by a very high impedance and/or a generally open switch.

Figure 4:
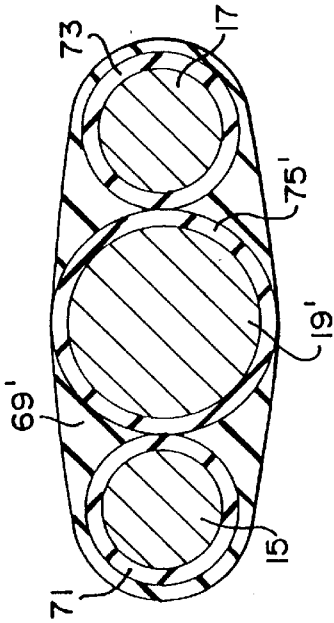
FIG. 4 is a schematic cross-sectional view similar to FIG. 3 illustrating a third preferred embodiment of the present invention with the sensing lead enlarged with respect to the power and neutral lines.

As illustrated in FIG. 4, the sensing lead 19' is preferably larger than the power line 15 and the neutral line 17. The purpose for this is to prevent the formation of any current or arcing paths between the power and neutral lines that do not include the sensing lead.

In some situations, it may be desirable to provide for checking the integrity of the sensing lead. Accordingly, an integrity checking device 21 may be connected from the sensing lead 19 to the power line 15. Any suitable type of integrity checking device, such as a neon glow tube 22 with a limiting resistor 24 may be utilized. The impedance of the indicating device should be sufficiently large to limit the current flow through the integrity checking device to an amount well below a predetermined magnitude of arcing current flow selected for actuation of the arcing current protection arrangement.

Integrity checking device 21 could also be a switch 26 in series with a suitable limiting resistor 24, in which case not only the sensing lead integrity but also the operation of the arc protection arrangement could be tested.

A circuit opening device may be located in the appliance cord, such as in a plug connected to the appliance cord. Placing the arcing protection in the locality of the portion of line being protected aids in minimizing nuisance tripping, at the low level of currents to which response is desired.

Although any suitable type of circuit opening device could be utilized, in this preferred embodiment solenoid actuated normally closed contacts, illustrated as the normally closed switch 23 in power line 15, are employed. In most applications, it would also be desirable to have the solenoid open normally closed contacts in the neutral line 17, as represented by the normally closed switch 25.

Energization of solenoid coil 27 is controlled by a suitable switching device, such as a silicon controlled rectifier (SCR) 29. The circuit of anode 31 and cathode 33 of SCR 29 is connected in series with the solenoid coil 27. Gate 35 of SCR 29 is connected to the sensing lead 19 and also to the cathode 33 through a resistor 37. A limiting resistor 39 is connected between gate 35 of SCR 29 and sensing lead 19.

DC current for the solenoid coil 27 is obtained from a rectifier 41. Any suitable rectifier circuit may be utilized, but in this particular situation a full wave rectifier formed by diodes 43, 45, 47 and 49 is employed. Rectifier 41 is connected between power line 15 and neutral line 17 to provide DC current for the solenoid coil 27 and the anode-cathode circuit of the SCR 29.

When an arcing current in excess of the predetermined magnitude occurs in sensing lead 19, due, for example, to a breakdown of the insulation between power line 15 and neutral line 17, the current through resistor 37 causes the gate 35 of SCR 29 to bias the anode-cathode circuit of SCR 29 to a conducting state. The resulting current flow through the solenoid coil 27 causes the normally closed switch 23 in power line 15 to be opened, as well as the normally closed switch 25 in neutral line 17, where utilized. In this way, the existence of arcing currents in excess of the predetermined magnitude removes the power from appliance load 13 to prevent potentially hazardous conditions caused by the arcing currents.

A test circuit may also be employed to check operation of the circuit opening device. This test circuit may utilize a simple switch and resistance from the power line. Although a single resistor 51 could be employed, in this particular arrangement a pair of resistors 51 and 53 is employed, so that a change in the input polarity will not preclude testing. A manually actuatable switch 55 may be connected from the midpoint of resistors 51 and 53 to the gate 35 of SCR 29. When this normally opened switch 55 is closed, a current in excess of the predetermined magnitude will flow through resistors 51 and 37 (or resistors 53 and 37 in the event of polarity reversal), which will bias gate 35 to trigger SCR 29 into conduction. Thus, the test circuit may be utilized to verify correct operation of the current responsive SCR 29 and the circuit opening solenoid coil 27.

A second embodiment of the arcing current protection arrangement, combined with a GFCI 57, is illustrated in FIG. 2. GFCI 57 employs a conventional differential transformer with a transformer core 59, in which the magnetic fluxes produced by the power line 15' and the neutral line 17' normally balance one another. (Portions of this circuit corresponding to the circuit of FIG. 1 are indicated by primed numerals.)

A secondary winding 61 is also located on the transformer core 59. If a differential in the flux produced by the current flowing in power line 15' and neutral line 17' is detected, the resultant signal produced in secondary winding 61 will cause a circuit opening device 63 to open the normally closed switch 23' in the power line 15' as well as the normally closed switch 25' in the neutral line 17', if used.

For use with the arcing current protection arrangement, a supplemental winding 65 is located on the differential transformer core 59. Supplemental winding 65 is connected between sensing lead 19' and the neutral line 17'. A suitable resistor 67 is located in series with the supplemental winding 65.

If an arcing current in excess of the predetermined magnitude is present in sensing lead 19', supplemental winding 65 will unbalance the differential transformer and produce a signal in the secondary winding 61 to actuate the circuit opening device 63. In this way, the protection of the embodiment of FIG. 1 against undesired arcing currents is directly incorporated into the GFCI 57.

A test circuit (not shown), such as that illustrated in FIG. 1, may also be incorporated in this embodiment. Also, it should be noted that in some situations the sensing lead 19' could be the ground line (in a three line arrangement), so that a separate sensing lead would not be required.

FIG. 3 illustrates one possible type of appliance cords, although various other forms could also be employed. In FIG. 3, a flat type of cord is utilized. An insulating sheath 69 incorporates the power line 15, the neutral line 17 and the sensing lead 19. In the particular version depicted, each of the power line 15, the neutral line 17 and the sensing lead 19 is surrounded by a respective insulating layer 71, 73 and 75. Any insulation damaging action, such as repeated bending of the cord or placement of heavy objects on the cord, would affect the insulation 75, as well as the insulation 71 and 73. Also, as depicted, it is important to have the sensing lead located between the power line 15 and the neutral line 17. Since the sensing lead is initially at the same potential as the neutral line, if the sensing lead is between the power and neutral lines any arcing current will first flow through the sensing lead 19.

Of course, other configurations could be utilized, such as employing a sensing lead that does not have a surrounding insulation 75, or, possibly, an arrangement in which the power line 15, the neutral line 17 and the sensing lead 19 are all potted in an insulating material.

FIG. 4 shows the same kind of cord as in FIG. 3, except that the sensing lead 19' is larger than the power line 15 and the neutral line 17. Correspondingly, the surrounding insulation 75' must be larger, and the insulating sheath 69' would have to be modified to accommodate the differing size lines. With this arrangement, by proper choice of the size of sensing lead 19', any arcing or current flow between power line 15 and neutral line 17 would have to pass through the sensing lead 19', thus insuring that the power line would be opened if that current exceeds the predetermined value.

Figure 5:
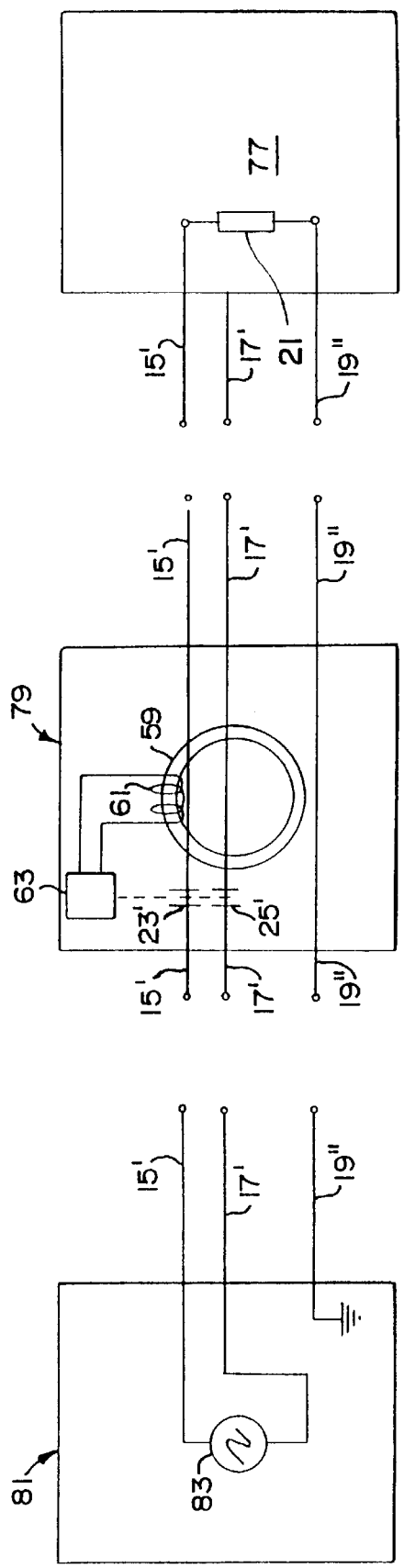
FIG. 5 is a schematic circuit diagram of the third preferred embodiment of FIG. 4 where the sensing lead is a ground lead and the invention is utilized in connection with the electrical supply system for a house or other building.

In FIG. 5, the invention is shown utilized in a house represented schematically at 77. The arcing or leakage current responsive system is equivalent in detecting arcing or leakage currents to that illustrated in FIGS. 2 and 4, with the exception that the sensing lead 19'' is also the ground line for the system. With this arrangement, the larger ground lead 19'' would pick up any leakage or arcing currents, thus unbalancing the differential transformer and causing the circuit to be opened. Of course, it should be recognized that the structure of FIG. 3 or that of U.S. Pat. No. 4,931,894 could be utilized, where the sensing lead 19 or sheath 39 is also the ground lead for the system. This circuit would be located in an appropriate location, such as a junction box illustrated schematically at 79.

Power is obtained from a suitable source, shown schematically at 81. A generator 83 is schematically represented in the source 81.

Figure 6:
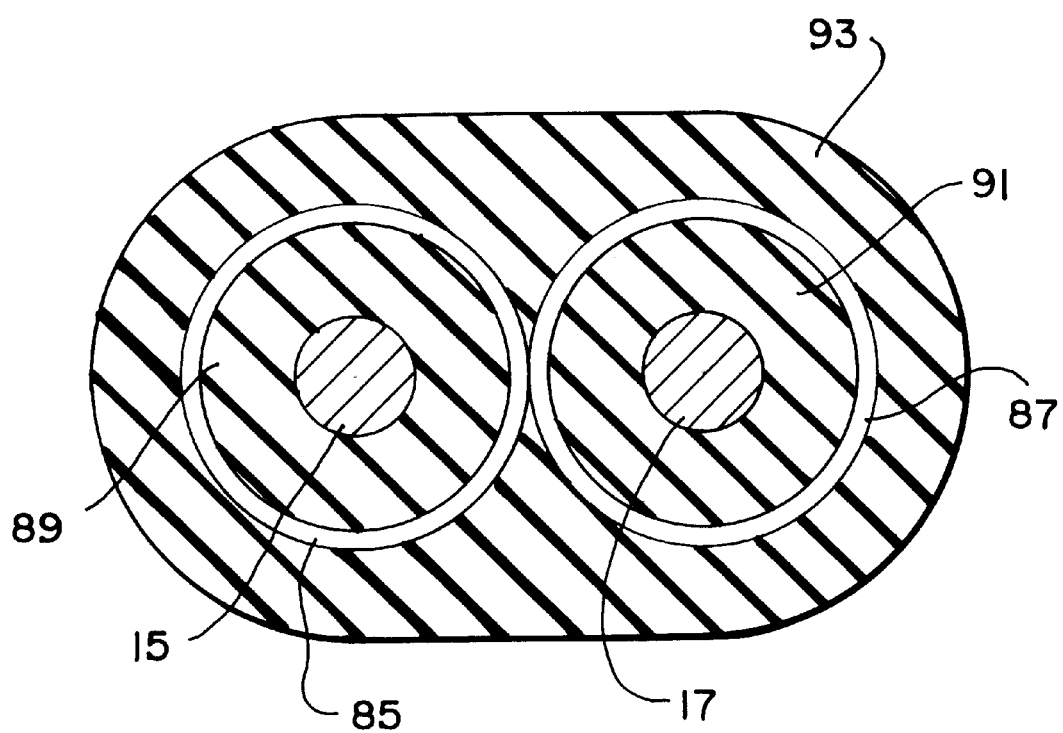
FIG. 6 is a schematic cross-sectional view similar to FIG. 3 of another embodiment in which both the power line and neutral line are surrounded by metallic sheaths which serve as the sensing lead in the circuits of FIG. 1 or FIG. 2.

FIG. 6 illustrates yet another embodiment of the invention that may be utilized with the circuits of FIG. 1 or FIG. 2. In this version, the power line 15 and neutral line 17 are enclosed within metallic sheaths 85 and 87, respectively. Insulating material 89 electrically separates the power line 15 from metallic sheath 85, while insulating material 91 similarly electrically separates the neutral line 17 from metallic sheath 87. Insulating material 93 then surrounds both metallic sheaths 85 and 87.

Metallic sheaths 85 and 87 are electrically interconnected to form a sensing lead to correspond to sensing lead 19 of FIG. 1 and sensing lead 19' of FIG. 2. Similarly, the sensing lead formed by metallic sheaths 85 and 87 may be connected to the power line 15 or 15' at the load through an integrity checking device 21 or 21'.

It should be understood that various modifications, changes and variations may be made in the arrangement, operation and details of construction of the elements disclosed herein without departing from the spirit and scope of this invention.

What is claimed is:

1. An electrical system of alternating current having an unshielded power line and an unshielded neutral line and including arc protection comprising:

an unshielded sensing lead located between the power line and the neutral line within an insulating sheath of a cord conveying energy to a load;

insulating means to normally electrically isolate said sensing lead from the power line and from the neutral line;

sensing lead integrity checking means connected from said sensing lead to the power line for conveying a current sufficient to indicate that said sensing lead is capable of conducting leakage current, said integrity checking means limiting the current therethrough to a value sufficiently low that it is not detected as an undesired leakage current;

circuit opening means to break the power line when actuated; and current responsive means connected between said sensing lead and the neutral line, said current responsive means actuating said circuit opening means when a leakage current in excess of a predetermined magnitude flows through said sensing lead as a result of a failure of said insulating means; and a test circuit connected to said sensing lead.

2. An electrical system as claimed in claim 1 wherein said current responsive means comprises a switching device.

3. An electrical system as claimed in claim 2 wherein said switching device is a silicon controlled rectifier.

4. An electrical system as claimed in claim 1 wherein said test circuit comprises:

a manually actuatable test switch connected between the power line and said sensing lead; and at least one test resistor connected in series with said test switch.

5. An electrical system as claimed in claim 1 wherein said integrity checking means comprises a neon glow tube connected in series with a resistor that limits current flow through said glow tube to substantially less than said predetermined magnitude.

6. An electrical system as claimed in claim 1 wherein said integrity checking means comprises a manually actuatable switch that can also be used to test operation of the arc protection arrangement.

7. An electrical system as claimed in claim 1 wherein said circuit opening means comprises:

normally closed contacts in the power line; and a solenoid coil to open said contacts.

8. An electrical system as claimed in claim 7 wherein said current responsive means comprises a silicon controlled rectifier having the anode-cathode circuit connected in series with said solenoid coil.

9. An electrical system as claimed in claim 1 wherein said current responsive means comprises a differential transformer with a supplemental winding connected between said sensing lead and the neutral line.

10. An electrical system as claimed in claim 1 for use with an appliance and said cord conveying energy is an appliance cord for the appliance.

11. An electrical system as claimed in claim 1 wherein said sensing lead is located between the power line and the neutral line in a flat cord.

12. An electrical system as claimed in claim 1 wherein said circuit opening means also breaks the neutral line when actuated.

13. An electrical system as claimed in claim 1 wherein said sensing lead is physically larger than the power line and the neutral line.

14. An electrical system as claimed in claim 13 wherein said sensing lead is the ground line of a three-line system.

15. An electrical system of alternating current having an unshielded power line and an unshielded neutral line and including arc protection comprising:

electrically conductive sensing means located between the power line and the neutral line;

insulating means to normally electrically isolate said sensing means from the power line and from the neutral line;

sensing means integrity checking means connected from said sensing means to the power line for conveying a current sufficient to indicate that said sensing means is capable of conducting leakage current, said integrity checking means limiting the current there through to a value sufficiently low that it is not detected as an undesired leakage current; wherein said integrity checking means comprises a neon glow tube connected in series with a resistor that limits current flow through said glow tube to substantially less than said predetermined magnitude;

a rectifier circuit connected between the power line and the neutral line;

a solenoid coil, energization of said solenoid coil opening a normally closed switch in the power line;

a silicon controlled rectifier, the anode-cathode circuit of said silicon controlled rectifier connected in series with said solenoid coil across the output of said rectifier circuit, the gate of said silicon controlled rectifier connected to said sensing means; and a resistor connected between the gate and the cathode of said silicon controlled rectifier, wherein a leakage current above a predetermined magnitude flowing through said sensing means creates a voltage drop across said resistor that biases said silicon controlled rectifier to a conducting state, thereby permitting current flow through said solenoid coil to open said normally closed switch in the power line.

16. An electrical system as claimed in claim 15 wherein said rectifier circuit comprises a diode full wave rectifier.

17. An electrical system as claimed in claim 15 and further comprising a test circuit connected to said sensing lead.

18. An electrical system as claimed in claim 17 wherein said test circuit comprises:

a pair of test resistors connected between the power line and the neutral line; and a manually actuatable test switch connected from the midpoint of said test resistors to the gate of said silicon controlled rectifier.

19. An electrical system as claimed in claim 15 wherein said integrity checking means comprises a switch in series with a resistor that also serves to test operation of the arc protection arrangement.

20. An electrical system of alternating current having a ground fault circuit interrupter with an unshielded power line and an unshielded neutral line and including arc protection comprising:

a differential transformer having a pair of opposed primary windings and a secondary winding located on the core thereof;

circuit opening means to break the power line when a trip signal is produced in said secondary winding by an imbalance in said differential transformer;

an unshielded sensing lead located between the power line and the neutral line within an insulating sheath of a cord conveying energy to a load, said sensing lead being substantially electrically isolated from the load being energized through the power line and the neutral line to preclude undesired tripping of said circuit opening means;

insulating means to normally electrically isolate said sensing lead from the power line and from the neutral line; and a supplemental winding located on the core of said differential transformer, said supplemental winding connected between said sensing lead and the neutral line to create an imbalance in said differential transformer and open the power line when a leakage current in excess of a predetermined magnitude flows through said supplemental winding as a result of a failure of said insulating means and an integrity checking means connected from said sensing lead to the power line.

21. An electrical system as claimed in claim 20 wherein said integrity checking means comprises a neon glow tube connected in series with a resistor that limits current flow through said glow tube to substantially less than said predetermined magnitude.

22. An electrical system as claimed in claim 20 and further comprising a test circuit connected to said sensing lead.

23. An electrical system as claimed in claim 22 wherein said test circuit comprises:

a pair of test resistors connected between the power line and the neutral line; and a manually actuatable test switch connected from the midpoint of said test resistors to said sensing lead.

24. An electrical system as claimed in claim 20 wherein said sensing lead is physically larger than the power line and the neutral line.

25. An alternating current electrical system having a power line and a neutral line and including arc protection comprising:

a first metallic sheath around the power line;

first insulating means between the power line and said first metallic sheath;

a second metallic sheath around the neutral line, said first and second metallic sheaths being electrically connected to provide a sensing lead;

second insulating means between the neutral line and said second metallic sheath;

third insulating means surrounding said first and second metallic sheaths;

sensing lead integrity checking means connected from said sensing lead to the power line for conveying a current sufficient to indicate that said sensing lead is capable of conducting leakage current, said integrity checking means limiting the current therethrough to a value sufficiently low that it is not detected as an undesired leakage current; a test circuit connected to said sensing lead;

circuit opening means to break the power line when actuated; and current responsive means connected between said sensing lead and the neutral line, said current responsive means actuating said circuit opening means when a leakage current in excess of a predetermined magnitude flows through said sensing lead as a result of a failure of said insulating means.

* * * * *